United States Patent [19]

Morinaga

[11] 4,345,723
[45] Aug. 24, 1982

[54] RETRACTOR PROVIDED WITH A TAKE-UP FORCE REDUCING MECHANISM

[75] Inventor: Masaru Morinaga, Yamato, Japan

[73] Assignee: NSK-Warner K.K., Tokyo, Japan

[21] Appl. No.: 188,034

[22] Filed: Sep. 17, 1980

[30] Foreign Application Priority Data

Oct. 9, 1979 [JP] Japan .......................... 54-138359[U]

[51] Int. Cl.³ ....................... A62B 35/00; B65H 75/48
[52] U.S. Cl. .............................. 242/107; 242/107.4 R
[58] Field of Search .......... 242/107, 107.4 R–107.4 E, 242/107.6, 107.7; 280/802–808; 297/475–480

[56] References Cited

U.S. PATENT DOCUMENTS 4,120,467 10/1978 Stephenson .............. 242/107.4 R X
4,162,772 7/1979 Shimogawa et al. ........ 242/107.4 R
4,198,011 4/1980 Kamijo et al. .................. 242/107.7

FOREIGN PATENT DOCUMENTS 2606293 9/1976 Fed. Rep. of Germany ...... 242/107

Primary Examiner—John M. Jillions
Attorney, Agent, or Firm—Shapiro and Shapiro

[57] ABSTRACT

A seat belt retractor is provided with a take-up force reducing mechanism which has two spiral springs at least one of which acts for webbing take-up and in which the webbing take-up force can be reduced by controlling at least one of the two spiral springs. The retractor comprises a cam formed integrally with a take-up shaft and having a small-diametered circular cam portion, a large-diametered circular cam portion and a spiral cam portion interconnecting said circular cam portions, a follower member adapted to follow the cam portions of the cam and during webbing pay-out, to move from one of the small-diametered and the large-diametered cam portion to the other via the spiral cam portion and during webbing rewind, to move from said other cam portion to said one cam portion via the spiral cam portion, and spring force controlling means for reducing the take-up force when the follower member is following the spiral cam portion.

4 Claims, 9 Drawing Figures

FIG. 5
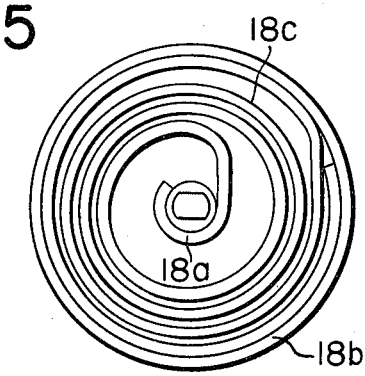
FIG. 6B
FIG. 6A
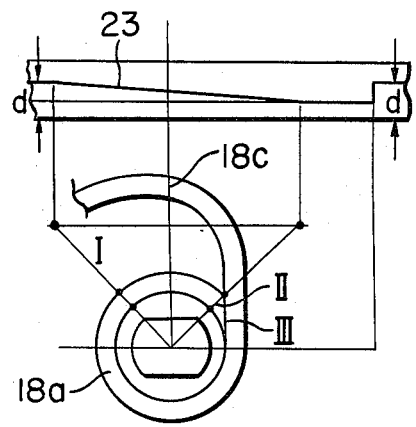
FIG. 7B
FIG. 7A
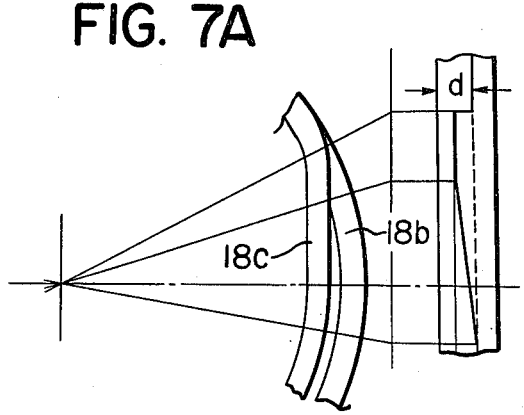

RETRACTOR PROVIDED WITH A TAKE-UP FORCE REDUCING MECHANISM

BACKGROUND OF THE INVENTION

1. Field of the Invention

This invention relates to a seat belt retractor provided with a take-up force reducing mechanism.

1. Description of the Prior Art

The seat belt retractors of this type already proposed are of the construction in which use is made of a take-up spring of strong take-up force and a take-up spring of weak take-up force and during the wearing of the seat belt, the take-up action of the strong take-up spring is suppressed and only the weak take-up spring is caused to perform its take-up action, or of the construction in which a take-up spring and a spring acting in the opposite direction to the take-up spring are provided and during the wearing of the seat belt, the latter spring is caused to act to reduce the take-up force.

However, these retractors already proposed have a disadvantage that the construction of the change-over means for reducing the take-up force is complex, and also have a disadvantage that the range in which the take-up force can be reduced is limited.

SUMMARY OF THE INVENTION

It is an object of the present invention to provide a seat belt retractor provided with a take-up force reducing mechanism which is simple in construction and reliable in operation.

The invention will become fully apparent from the following detailed description taken in conjunction with the accompanying drawings.

BRIEF DESCRIPTION OF THE DRAWINGS

FIG. 5 is a front view of a cam disc used in the retractor.

FIG. 6A is an enlarged view of a junction between a small-diametered circular cam groove portion 18a and a spiral cam groove portion 18c of the cam disc of FIG. 5, and FIG. 6B is a view showing the depth of the groove in the portion shown in FIG. 6A.

FIG. 7A is an enlarged view of the junction between a large-diametered circular cam groove portion and the spiral cam groove portion of the cam disc of FIG. 5, and FIG. 7B is a view showing the depth of the groove in the portion shown in FIG. 7A.

DESCRIPTION OF THE PREFERRED EMBODIMENTS

Figure 1:
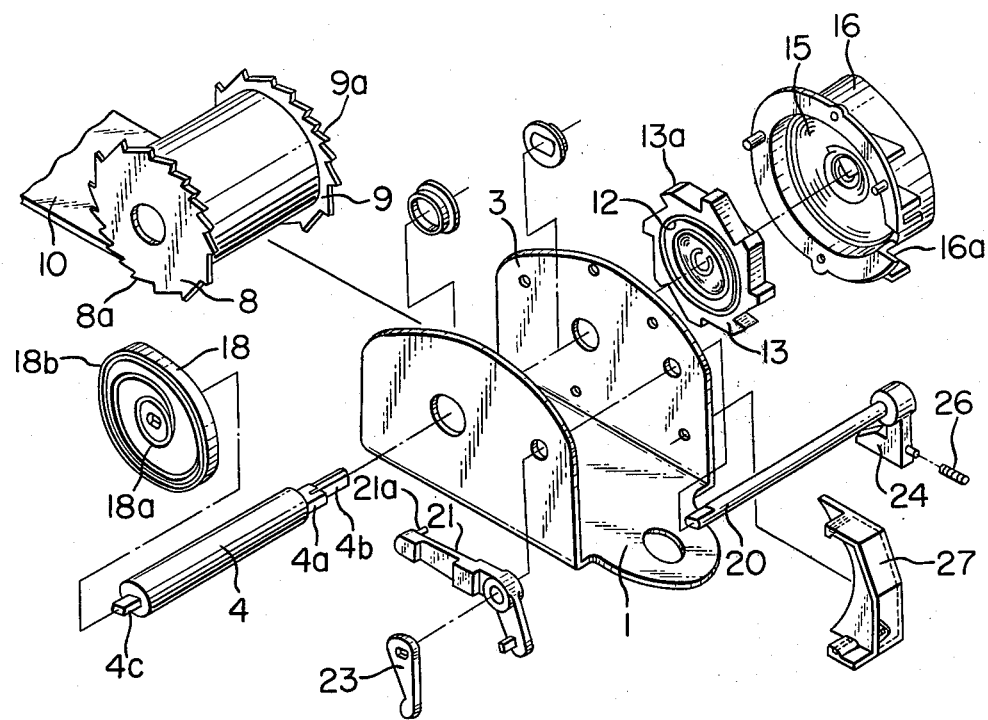
FIG. 1 is an exploded perspective view of an embodiment of a retractor in accordance with the present invention.
Figure 2:
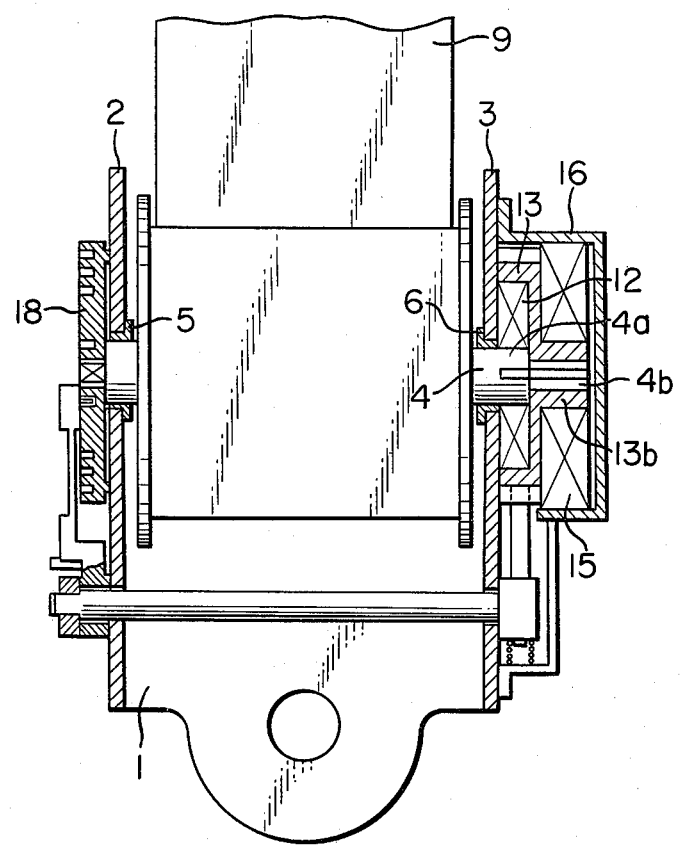
FIG. 2 is a front view in which essential portions of the embodiment are shown in axial cross-section.

A preferred embodiment of the present invention will hereinafter be described with reference to the drawings.

Referring to the drawings, a take-up shaft 4 is rotatably supported in opposed side plates 2 and 3 of the base 1 of a seat belt retractor, through bushings 5 and 6. Flanges 8 and 9 are secured to the take-up shaft 4 between the side plates 2 and 3, and webbing 10 is taken up between them. The flanges 8 and 9 are formed with ratchet gears 8a and 9a for emergency locking so as to be capable of preventing rotation of the take-up shaft in the webbing pay-out direction during emergency of the vehicle, but this emergency locking mechanism has no direct relation with the present invention and therefore is not described and shown in detail.

The inner end of a first weak spiral spring 12 for biasing the take-up shaft 4 in the webbing take-up direction is secured or hooked to a first portion 4a of the take-up shaft 4 which extends outwardly of the side plate 3. This first spiral spring 12 is contained in a rotatable ratchet 13. The ratchet 13 has on its outer periphery a ratchet gear portion 13a formed in the escape direction with respect to the rotation in the webbing pay-out direction. The box 13 has at its center a small-diametered cylindrical portion 13b facing axially outwardly and is fitted on the small-diametered extension 4b of the take-up shaft 4 by means of said small-diametered cylindrical portion 13b for rotation with respect to the take-up shaft 4. The inner end of a second spiral spring 15 of strong spring force acting in the webbing take-up direction is secured to the small-diametered cylindrical portion 13b of the box 13. The second spiral spring 15 is contained in a spring cover 16 fixed to the base side plate 3. Accordingly, with the ratchet 13 being free to rotate, the strong take-up force of the second spiral spring 15 acts on the take-up shaft 4 through the ratchet 13 and the first spiral spring 12 to enable abrupt take-up of the webbing. On the other hand, when the ratchet 13 is fixed in a manner to be described, only the weak take-up force of the first spiral spring 12 acts on the take-up shaft 4, that is, the take-up force is reduced by an amount corresponding to the spring force of the second spiral spring.

A cam disc 18 is secured to the portion 4c of the take-up shaft 4 which extends outwardly of the side plate 2. The cam disc 18 has on its outside surface a cam track in the form of a cam groove comprising a small-diametered circular cam groove portion 18a, a large-diametered circular cam groove portion 18b and a spiral cam groove portion 18c interconnecting said circular cam groove portions.

Between the base side plates 2 and 3, a pivot shaft 20 is provided pivotably with respect to the base side plates, and a pin 21a provided at one end of a preferably resilient follower lever 21 rotatably and loosely fitted on the pivot shaft 20 is engaged with the cam groove of the cam disc 18. During rotation of the take-up shaft 4, the follower lever 21 follows the cam groove in a manner to be described and rotates about the pivot shaft 20. In the present embodiment, the small-diametered circular cam groove portion 18a corresponds to the webbing take-up condition and, when the webbing 10 begins to be paid out, the pin 21a of the follower lever 21 is guided in the spiral cam groove portion 18c and after a predetermined number of rotations (preferably, three to four full rotations) of the take-up shaft 4 corresponding to the spiral cam groove portion 18c, the pin 21a is guided into the large-diametered circular cam groove portion 18b. From after the pin 21a has been guided into this large-diametered circular cam groove portion 18b until the pay-out of the webbing is terminated, the pin 21a of the follower lever 21 stays in the large-diametered circular cam groove portion 18b during the rotation of the take-up shaft in the pay-out direction.

When the webbing is rewound from this state, the pin 21a of the follower lever 21 is guided from the large-diametered circular cam groove portion 18b into the small-diametered circular cam groove portion 18a via the spiral cam groove portion 18c and stays in the small-diametered circular cam groove portion 18a until the take-up is terminated. For such follow-up movement of the pin 21a of the follower lever 21, the junction between the small-diametered circular cam groove portion 18a and the spiral cam groove portion will be described with reference to FIGS. 6A and 6B. In FIG. 6, the cam groove has a depth d from the spiral cam groove portion 18c to the portion I of the small-diametered circular cam groove portion 18a, but from the portion I to the portion II passing through the point of intersection between the spiral cam groove and the small-diametered circular cam groove 18a and the center of the small-diametered circular cam groove 18a, the cam groove becomes gradually shallower (the inclined line 23 in FIG. 6B), and forms a shallow flat cam bottom in the triangular portion from the portion II to the line of intersection III with the spiral cam groove portion 18c, thus forming a step between it and the spiral cam groove portion 18c. Accordingly, when the take-up shaft 4 is rotated in the webbing pay-out direction, namely, in the clockwise direction as viewed in FIG. 6, the pin 21a of the follower lever 21 is guided from the small-diametered circular groove portion 18a into the spiral groove portion 18c, since the pin cannot lift sharply up the step, but when the take-up shaft 4 is rotated in the webbing take-up direction, namely, in the counter-clockwise direction as viewed in FIG. 6, the pin 21a is guided from the spiral cam groove portion 18c into the small-diametered circular groove portion 18a, whereafter the pin 21a stays in the small-diametered circular cam groove portion 18a until the termination of the take-up.

The junction between the spiral cam groove portion 18c and the large-diametered circular groove portion 18b (see FIGS. 7A and 7B) is also of a similar construction. During the rotation of the take-up shaft 4 in the webbing take-up direction, the pin 21a of the follower lever 21 is guided from the large-diametered circular cam groove portion 18b into the spiral cam groove 18c, but during the rotation of the take-up shaft 4 in the webbing draw-out direction, the pin 21a is guided from the spiral cam groove portion 18c into the large-diametered circular cam groove portion 18b, whereafter the pin 21a stays in the cam groove portion 18b till the termination of the draw-out.

Figure 3:
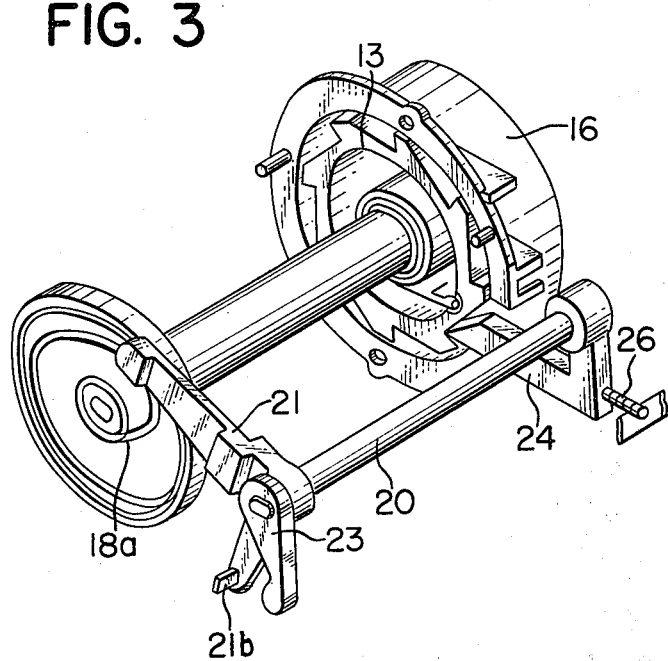
FIG. 3 is a perspective view of the essential portions of the embodiment showing a reduced take-up force condition.

Thus, the follower lever 21 assumes its clockwisely pivoted position (FIG. 3) during the webbing draw-out of the take-up shaft 4, and assumes its counter-clockwisely pivoted position (FIG. 4) during the rotation of the take-up shaft in the webbing take-up direction.

The follower lever 21 is supported on the pivot shaft 20, and an interlocking lever 23 adapted to engage a piece 21b formed at the other end of the follower lever 21 during counter-clockwise rotation of the follower lever 21 is fixed to the pivot shaft 20. When engaged with the interlocking lever 23, the piece 21b pushes the interlocking lever 23 counter-clockwisely to rotate the pivot shaft 20 counterclockwisely.

A pawl lever 24 is secured to the pivot shaft 20 at a position opposed to the ratchet gear portion 13a of the ratchet 13. The pawl of the pawl lever 24 is biased by a spring 26 so that it meshes with the ratchet gear portion 13a of the ratchet 13 when the follower lever 21 is in its clockwisely rotated position shown in FIG. 3. That is, the pivot shaft 20 is biased clockwisely by the spring 26. The spring cover 16 is formed with a cut-away 16a for guiding the pawl lever 24. A cover 27 secured to the base side plate 3 to support the spring 26 protects the pawl lever 24. Since the pivot shaft 20 is rotated counter-clockwisely by counter-clockwise rotation of the follower lever 21, the pawl lever 24 becomes disengaged from the ratchet gear portion 13a of the ratchet 13.

The operation of the present embodiment will hereinafter be described.

Figure 4:
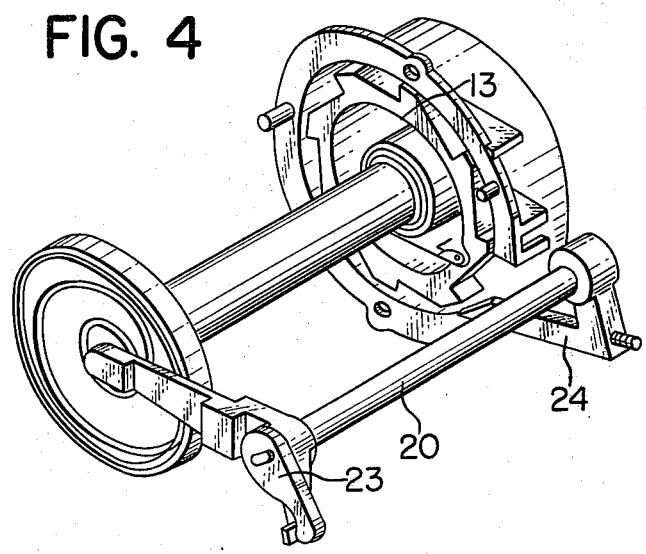
FIG. 4 is a perspective view of the essential portions of the embodiment showing a non-reduced take-up force condition.

When the take-up shaft 4 has taken up the webbing 10 thereon, the pin 21a of the follower lever 21 is in engagement with the small-diametered circular cam groove portion 18a of the cam disc 18 and accordingly, the follower lever 21 is in its counter-clockwisely rotated position shown in FIG. 4 and the pawl lever 24 is in non-meshing position with the ratchet gear portion 13a of the ratchet 13.

When the webbing 10 is paid out, the follower lever 21 follows toward the large-diametered circular cam groove portion 18b and the pawl lever 24 comes into meshing position with the ratchet gear portion 13a, but since the ratchet gear portion 13a is in escape direction with respect to the rotation in the webbing pay-out direction, the first and second spiral springs 12 and 15 are tightened.

When the seat belt is worn, the webbing 10 is slightly rewound to fit to the wearer, but at this time, the ratchet 13 is prevented from rotating in the take-up direction by the pawl lever 24 and therefore, the strong spring force of the second spiral spring 15 does not act on the take-up shaft 4, but the take-up shaft 4 is subjected only to the weak take-up force of the first spiral spring 12 and accordingly, the webbing contacts the belt wearer with the weak spring force of the second spiral spring whose take-up force has been reduced and thus, the wearer feels only a small take-up force. At this time, the pin 21a of the follower lever 21 is in engagement with the spiral cam groove portion 18c.

When the seat belt is taken off, the webbing is first rewound by the spring force of the first spiral spring 12 and, when the pin 21a of the follower lever 21 comes from the spiral cam groove portion 18c to the small-diametered circular cam groove portion 18a, the pivot shaft 20 is rotated counterclockwisely and the pawl lever 24 comes out of the meshing position with the ratchet gear portion 13a of the ratchet 13. Thereafter, the take-up shaft 4 is subjected to the strong take-up force of the second spiral spring 15 through the ratchet 13 and the first spiral spring 12 and thus, the webbing is taken up rapidly.

In the above-described embodiment, the follower lever is moved with the small-diametered cam groove portion corresponding to the webbing take-up condition and with the large-diametered cam groove portion corresponding to the webbing pay-out condition, but this may be reversed. In that case, the direction of turn of the spiral cam groove portion would be opposite to that in the above-described embodiment.

Also, in the above-described embodiment, the second spiral spring is, so to speak, of a serial type in which it is connected to the take-up shaft through the ratchet for the first spiral spring, whereas it is also possible to directly connect to the shaft the first spiral spring acting in the take-up direction and the second spiral spring acting in the opposite direction and control the ratchet for the second spiral spring by the pawl lever so that during the seat belt wearing, the take-up force of the first spiral spring is reduced by the second spiral spring.

According to the present invention, there is provided a retractor with a take-up force reducing mechanism which is simple in construction and reliable in operation.

According to the present invention, the take-up force reduction range can be simply increased by selecting a great length for the spiral cam groove.

I claim:

1. A seat belt retractor provided with a take-up force reducing mechanism which has two spiral springs, at least one of which acts for webbing take-up and in which the webbing take-up force can be reduced by controlling at least one of the two springs, the retractor including:

a take-up shaft;

a cam rotatably fixed to the take-up shaft and having a cam track with a small-diameter circular cam portion, a large-diameter circular cam portion, and a spiral cam portion interconnecting the circular cam portions;

a cam follower adapted to follow the cam portions of the cam track;

cam follower guide means at the junctions of the respective cam track portions for (a) guiding the cam follower during webbing pay-out from one of the small-diameter and large-diameter cam portions to the spiral cam portion, then into the other of the small-diameter and large-diameter cam portions, (b) then retaining the cam follower in said other circular cam portion during continued webbing pay-out, (c) guiding the cam follower during webbing rewind from said other circular cam portion into the spiral cam portion, then from the spiral cam portion into said one circular cam portion, and (d) then retaining the cam follower in said one cam portion during continued webbing rewind; and spring force controlling means for reducing the take-up force when the cam follower is retained in said other circular cam portion.

2. A retractor according to claim 1, wherein the cam track is a cam groove, and the cam follower guide means includes a first step in the groove at the junction of the small-diameter cam portion and the spiral cam portion, and a second step in the groove at the junction of the spiral cam portion and the large-diameter cam portion.

3. A retractor according to claim 1, having a spiral spring disposed in a rotatable ratchet and directly connected to the take-up shaft and a second spiral spring capable of imparting a take-up force to the take-up shaft through said ratchet, and wherein said spring force controlling means fixes said ratchet when said follower member is following said spiral cam portion.

4. A retractor according to claim 3, wherein said ratchet has a ratchet gear portion and said spring force controlling means has a pivotable member pivotable in response to the follow-up movement of said follower member, said pivotable member being adapted to mesh with the ratchet gear portion of said ratchet when said follower member follows said spiral cam portion, to thereby prevent said ratchet from being rotated in the webbing take-up direction.

* * * * *